(12) United States Patent
Spaulding et al.

(10) Patent No.: US 8,191,949 B2
(45) Date of Patent: Jun. 5, 2012

(54) FOOD UTENSIL

(76) Inventors: Diana A. Spaulding, Gurnee, IL (US);
Ronald E. Spaulding, Gurnee, IL (US)

( * ) Notice: Subject to any disclaimer, the term of this patent is extended or adjusted under 35 U.S.C. 154(b) by 154 days.

(21) Appl. No.: 12/585,051

(22) Filed: Sep. 1, 2009

(65) Prior Publication Data

US 2010/0050441 A1    Mar. 4, 2010

Related U.S. Application Data

(60) Provisional application No. 61/136,416, filed on Sep. 3, 2008.

(51) Int. Cl.
*B66C 1/00* (2006.01)

(52) U.S. Cl. .......................................... 294/118; 294/16

(58) Field of Classification Search .................. 294/118, 294/16, 50.8, 99.2; 30/142–149; D7/686, D7/687, 644
See application file for complete search history.

(56) References Cited

U.S. PATENT DOCUMENTS

| | | | | |
|---|---|---|---|---|
| 1,457,445 A | * | 6/1923 | Marcum | 294/116 |
| 1,742,232 A | * | 1/1930 | Casale | 294/118 |
| 2,644,455 A | * | 7/1953 | Benoit | 606/205 |
| 2,892,655 A | * | 6/1959 | Bower | 294/106 |
| 3,361,468 A | * | 1/1968 | Case | 294/8 |
| 4,182,032 A | | 1/1980 | Newport | |
| 4,521,964 A | | 6/1985 | Maruyama | |
| 2006/0260136 A1 | * | 11/2006 | Houle | 30/142 |
| 2008/0022534 A1 | * | 1/2008 | Kim | 30/142 |

FOREIGN PATENT DOCUMENTS

| | | |
|---|---|---|
| CH | 581 421 | 11/1976 |
| FR | 2 897 520 | 8/2007 |

* cited by examiner

*Primary Examiner* — Saul Rodriguez
*Assistant Examiner* — Gabriela Puig
(74) *Attorney, Agent, or Firm* — Richard C. Litman

(57) ABSTRACT

The food utensil is a scissor-like eating utensil that permits a user to retrieve snack foods from a container. The utensil comprises a pair of blades pivoted to each other. The blades have respective handles at one end and terminate with respective planar-configured forks at the other end. The dimensions of the blades, handles and forks are designed to enhance retrieval of snack foods from containers in a sanitary manner.

3 Claims, 3 Drawing Sheets

FOOD UTENSIL

CROSS-REFERENCE TO RELATED APPLICATION

This application claims the benefit of U.S. Provisional Patent Application Ser. No. 61/136,416, filed Sep. 3, 2008.

BACKGROUND OF THE INVENTION

1. Field of the Invention

The present invention generally relates to eating utensils, and particularly to a food utensil that provides a scissor-like utensil having flat forks designed for retrieving snack foods.

2. Description of the Related Art

It is almost a given that snack foods will be made available whenever a gathering occurs and food and/or drinks are to be served. Parties, family dinners, business meetings and the like all often include snack foods, such as pretzels, peanuts, potato chips, popcorn, etc. In most instances, snack foods are served in containers (including original packaging) for retrieval by hand (thus the designation of finger-food). However, this method of retrieval creates the inconvenience of soiling the fingers of the retrievers. Furthermore, there is also the potential for contaminating the remaining food if harmful bacteria are transferred from the fingers to the food. A device that would prevent the occurrence of the above-described scenarios would be a welcome addition to the utensil art. Thus, a food utensil solving the aforementioned problems is desired.

SUMMARY OF THE INVENTION

The food utensil is configured as a scissor-like eating utensil that permits a user to retrieve snack foods from a container. The utensil comprises a pair of blades pivoted to each other. The blades each have handles at one end and terminate with respective planar-configured forks at the other end. The dimensions of the blades, handles and forks are designed to enhance retrieval of snack foods from containers in a sanitary manner. The utensil can be fabricated from any suitable (dishwasher-safe) non-toxic material.

Accordingly, the invention presents a utensil that allows a user to efficiently retrieve snack foods from a container without contacting the food with hands and/or fingers. The utensil is safe, easy to use and can be washed for reuse. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
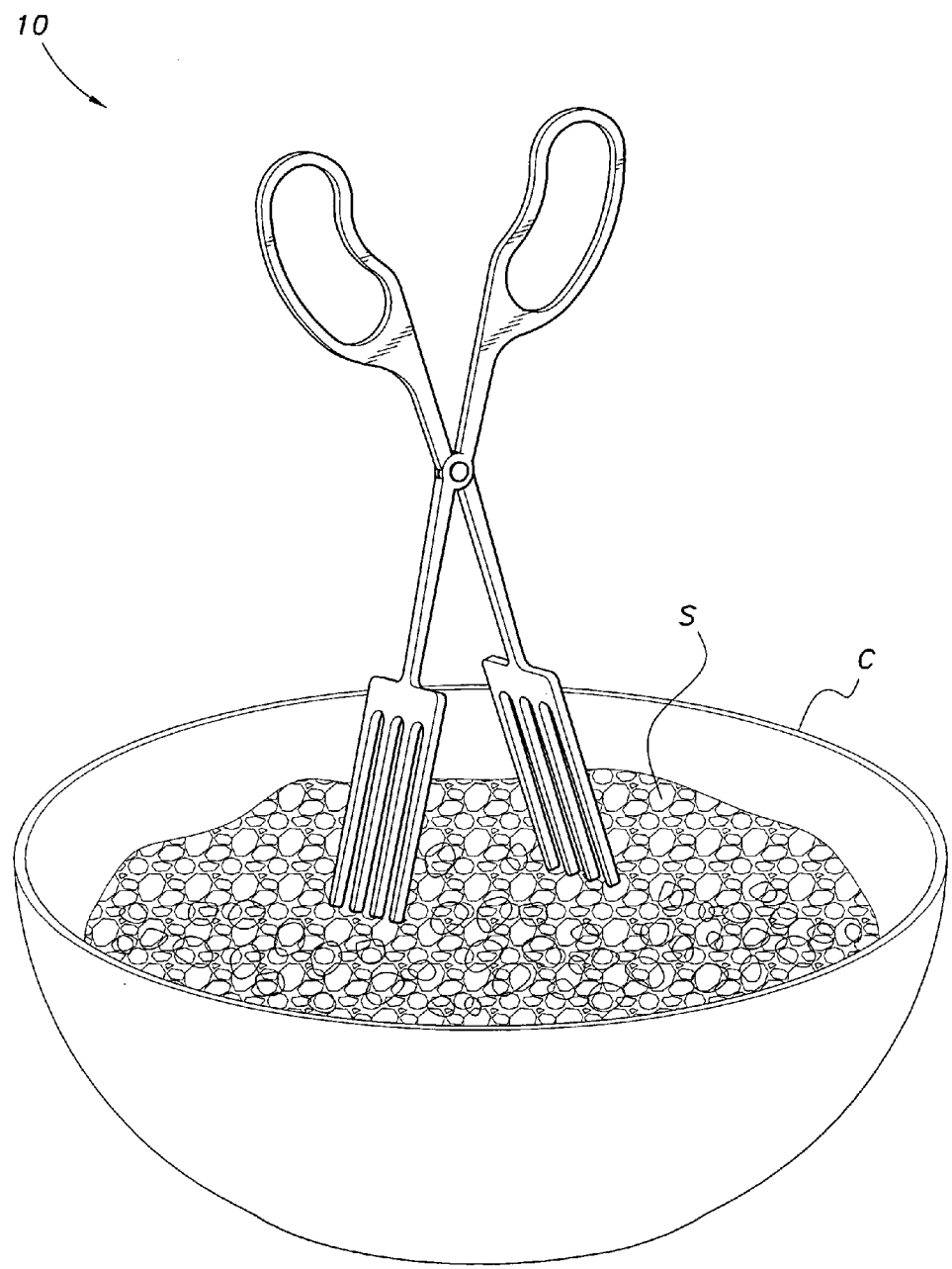
FIG. 1 is an environmental, perspective view of a food utensil according to the present invention.
Figure 2:
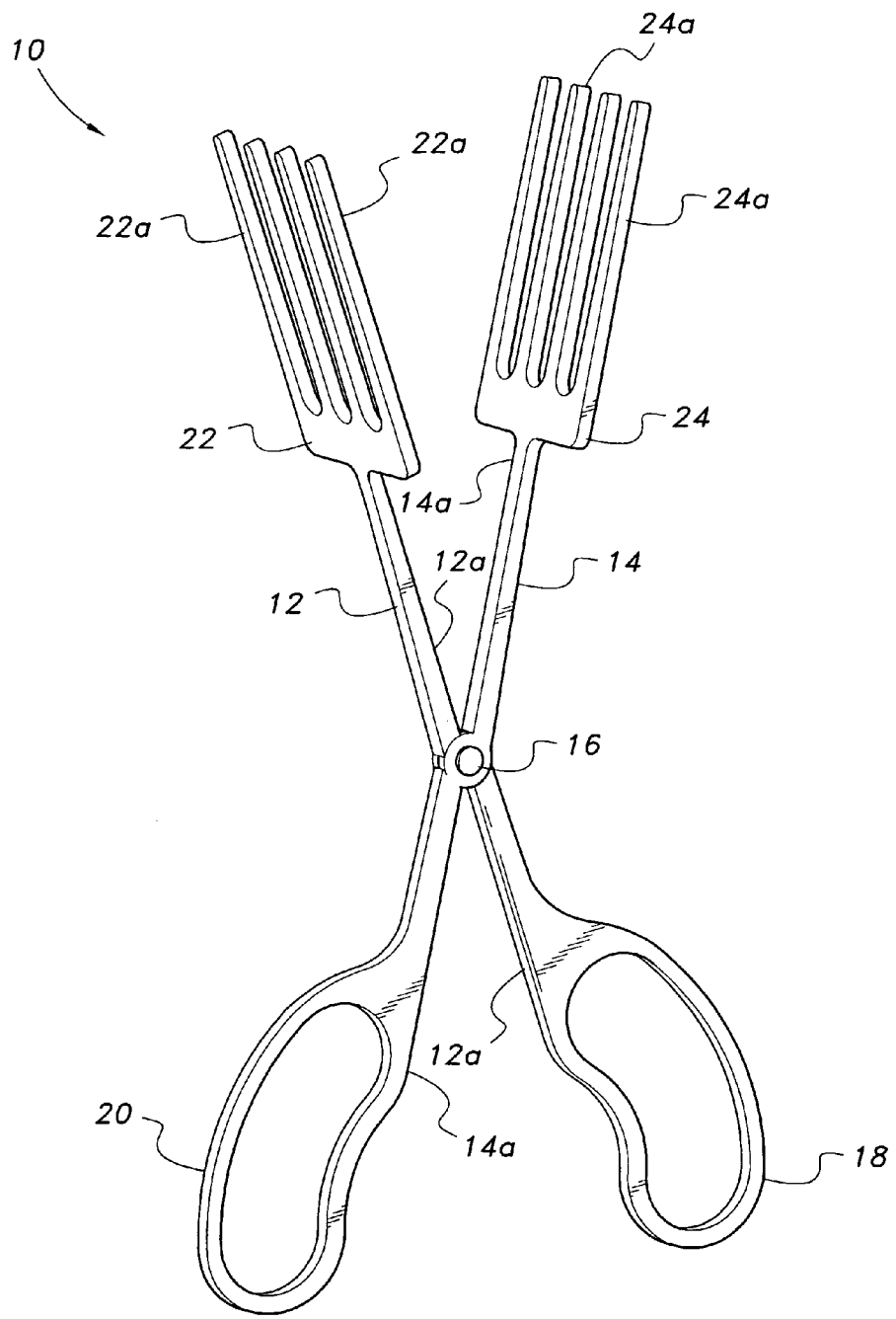
FIG. 2 is a perspective view of a food utensil according to the present invention.
Figure 3:
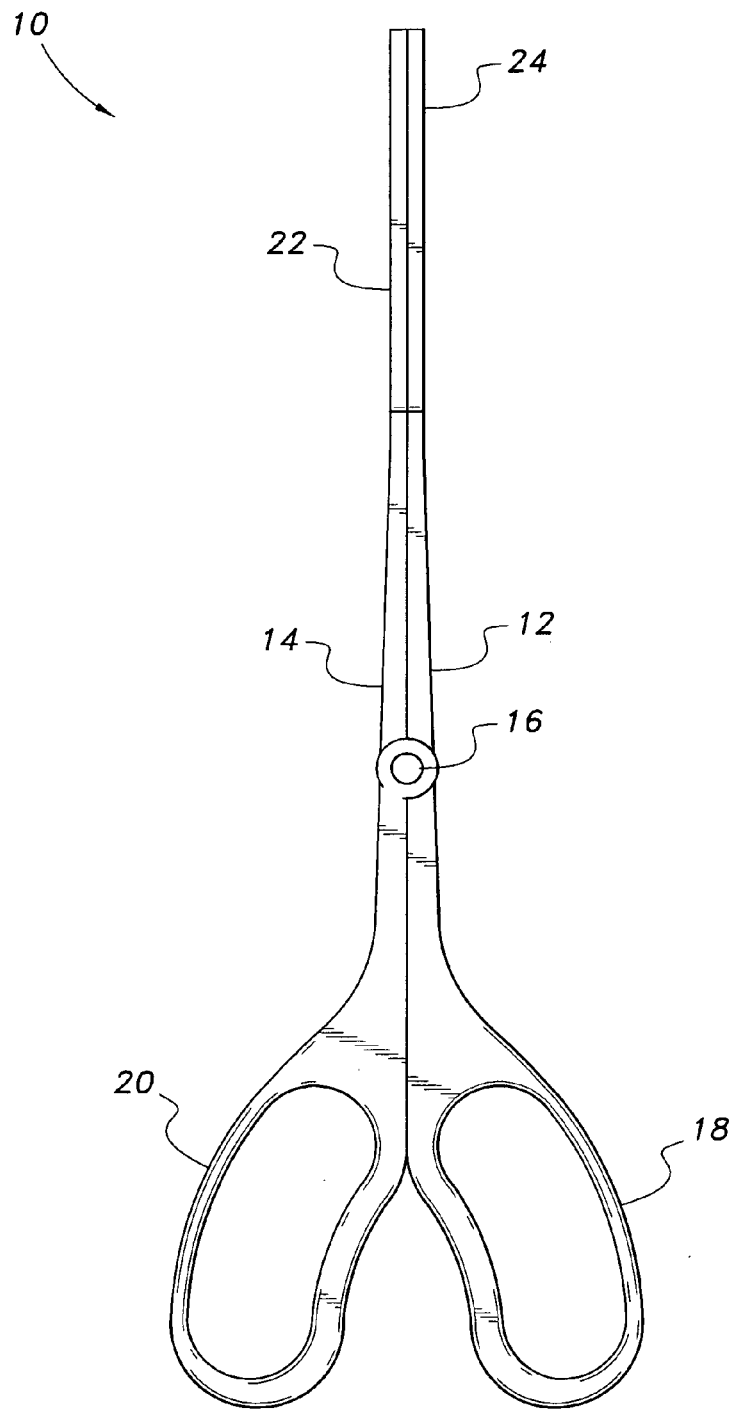
FIG. 3 is a side view of a food utensil according to the present invention.

Referring to FIGS. 1-3, the food utensil 10 comprises blades 12 and 14 pivoted to each other at 16 approximately midway their length. The inner edges 12a, 14a are continuously planar or flat. The proximal ends of blades 12 and 14 terminate in respective handle members 18 and 20. Each handle member 18, 20 is provided with an ergonomically designed opening therethrough to enhance comfort. Each handle opening is dimensioned to permit manipulation of the utensil 10 with at least one finger per blade to pivot the blades 12, 14. The distal ends of blades 12 and 14 terminate in respective fork portions 22 and 24. Each fork includes respective tines 22a, 24a. Fork portions 22, 24 are configured to present planar or flat, parallel surfaces that are in abutment when the utensil is closed. The overall length of the utensil is approximately 7". The lengths of the fork portions 22, 24 and the handle members 18, 20 are each approximately 2" respectively. The width of each respective fork portion is 1". It has been determined that these dimensions are optimal and permit the utensil to function as an extension of the users' fingers, although a food utensil 10 that varies from the above dimensions is within the scope of the invention as claimed. The planar or flat surfaces of the fork portions 22, 24 enhance the grasping of the snack food.

In use, the thumb and a finger (middle) are inserted in the openings in handle members 18 and 20. The utensil is opened in preparation to retrieve a snack morsel S from container C (FIG. 1). Closing the utensil will grasp a snack morsel between the planar or flat surfaces of fork portions 22, 24. The morsel can be retrieved without the users' hand ever contacting the snacks.

It is to be understood that the present invention is not limited to the embodiment described above, but encompasses any and all embodiments within the scope of the following claims.

We claim:

1. A food utensil, consisting of:

a pair of elongated, continuous blade members pivotally attached to each other, each of the blade members having a proximal end and a distal end, the pair of blade members being pivotally attached approximately midway between the distal end and the proximal end, each of the blade members having a distal portion located from the pivot to the distal end, wherein substantially the entire distal portion has a flat inner edge, each of the blade members being configured to criss-cross at the pivotal attachment whereby overlapping is prevented;

a handle member disposed at the proximal end of each of the blade members, each of the handle members defining a finger hole therein; and a fork member disposed at the distal end of each of the blade members, the fork members having opposing flat, planar surfaces, wherein the planar surfaces define the entire fork member and are coplanar with the flat inner edge of the distal portion of each blade member.

2. The food utensil according to claim 1, wherein the utensil has a length of approximately seven inches.

3. The food utensil according to claim 1, wherein each said fork member has a length of about two inches and a width of about one inch.

* * * * *